Sept. 19, 1933.   R. C. GRIFFITH   1,927,641
TRANSMISSION AND SYNCHRONIZING DEVICE
Filed Dec. 17, 1930
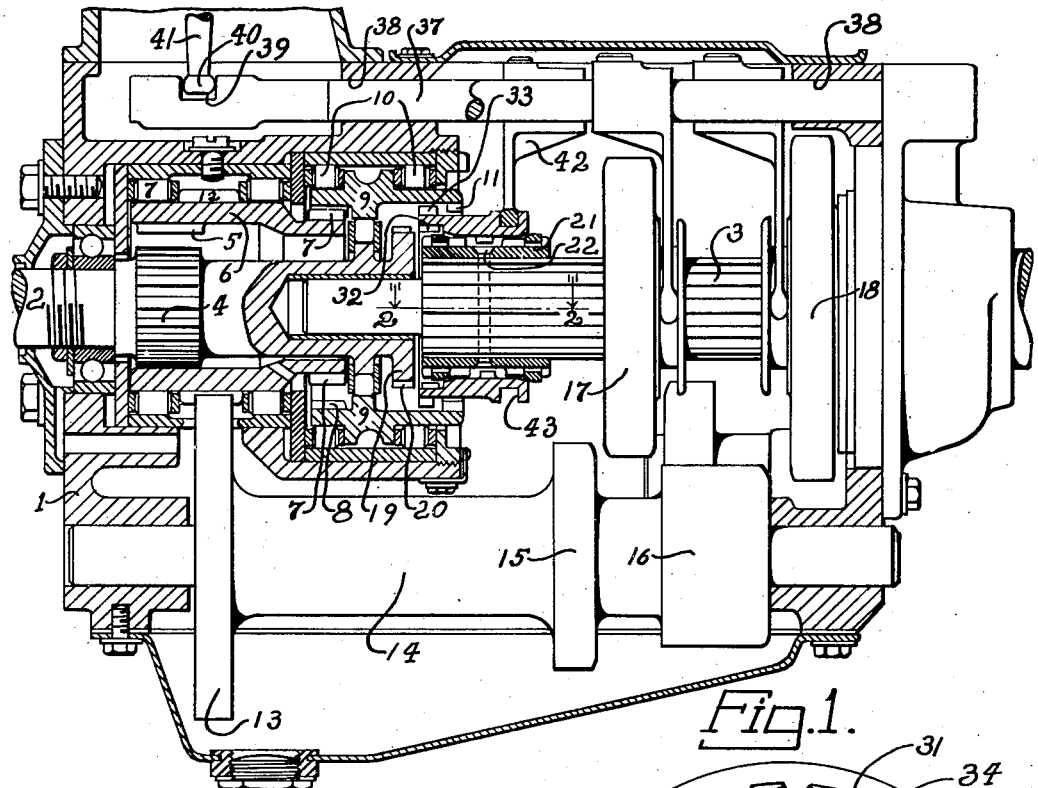
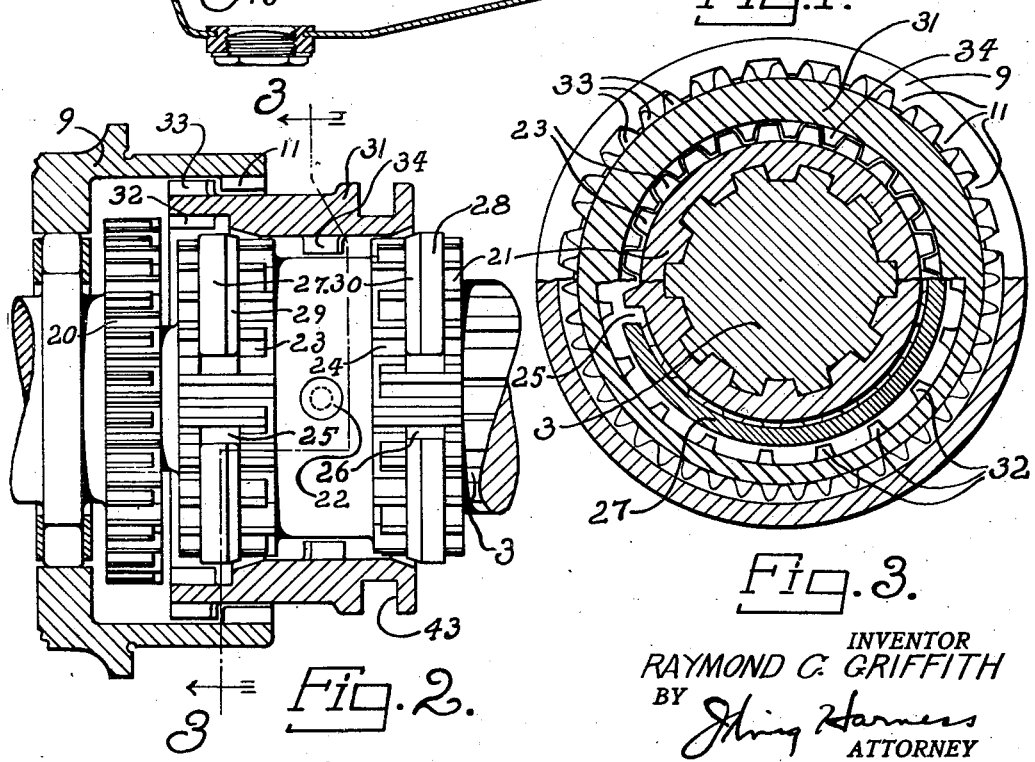
INVENTOR
RAYMOND C. GRIFFITH
BY
ATTORNEY Patented Sept. 19, 1933

1,927,641

UNITED STATES PATENT OFFICE 1,927,641

TRANSMISSION AND SYNCHRONIZING DEVICE

Raymond C. Griffith, Detroit, Mich., assignor to Chrysler Corporation, Detroit, Mich., a corporation of Delaware Application December 17, 1930
Serial No. 503,026

4 Claims. (Cl. 74—59)

This invention relates to an improved transmission of the character which is used in vehicles and particularly to improved gear synchronizing means thereof.

The main objects of the invention are to provide an improved transmission of the type which has a slidably mounted clutch member for forming two or more different driving relations between the driving or clutch shaft of the transmission and the driven or main shaft thereof; to provide a shiftable clutch member which is independently rotatable and which is capable of being brought into synchronous rotation with the driven member of the transmission; to provide a double acting clutch member of this kind which interlocks with a co-operating clutch element on the driving shaft, when one driving relation is being set up, and interlocks with a co-operating clutch element of lower speed driving mechanism, when the other driving selection is made, before it comes into engagement with the clutch element of the main shaft; to provide a light weight shiftable clutch element of this character which is readily rotated in unison with the driving shaft, or clutch element of the lower speed driving mechanism without causing severe clashing between the teeth with which it meshes; to provide improved means for substantially synchronizing the rotation of the driving shaft, in one instance, and the lower speed driving mechanism in another instance, with the rotation of the driven shaft after the shiftable clutch member has been engaged with either of its co-operating clutch elements and before it is moved into a driving relation with the driven shaft; and to provide alternate protruding teeth on the clutch elements of the clutch shaft and lower speed driving mechanism, and co-operating teeth on the slidable clutch element which are spaced apart a distance equal to the width of several teeth for enabling the slidably mounted clutch member of the transmission to be conveniently meshed with the teeth of the clutch shaft and lower speed driving member.

Further objects of the invention are to provide on the clutch member of the driven shaft, a pair of frictionally operative synchronizing devices having carefully ground surfaces which are adapted to seat upon similarly prepared continuous surfaces of the shiftable clutch member; and to provide self-energizing, frictionally acting bands for this purpose which are expanded by relative rotation of the driving and driven clutch parts of a transmission as the latter are moved together so as to augment the force of friction between the bands and their seats.

An illustrative embodiment of the invention is shown in the accompanying drawing, in which:

Fig. 1 is a vertical section of a vehicle transmission which embodies my invention.

Fig. 2 is an enlarged central horizontal section taken on the line 2—2 of Fig. 1.

Fig. 3 is a transverse section taken on the line 3—3 of Fig. 2.

In vehicle transmissions, particularly of the four-speed type, it is customary to employ one shiftable clutch element for selectively connecting the main or driven shaft of the transmission with two driving members which rotate at different speeds. When a shiftable clutch element of this kind is splined on the main shaft or otherwise secured against rotation thereon, its teeth are selectively brought into engagement with the teeth of co-operating clutch elements on the driving members, while the latter are rotating at different rates than the main shaft, causing severe clashing of the engaged teeth.

In the present invention, the shiftable clutch member which effects these two driving relations between the clutch and main shafts of the transmission is free to rotate independently when it is in an inoperative position and it is adapted to be positively connected with either of the driving members and to rotate therewith before it is engaged with the driven member. The shiftable clutch element includes a sleeve of light weight which, when initially connected to the clutch elements of the driving members, offers comparatively little resistance to rotation and it may therefore be positively connected to the clutch elements of the driving members without creating severe clashing of the teeth.

The driven member of the main shaft of the transmission carries elements which frictionally engage the shiftable clutch member during movement of the latter from its initial, partially meshed relation with the clutch elements of the driving members to a fully meshed relation therewith, so as to synchronize the rotation of the shiftable clutch element, and the parts with which it is connected, with the rotation of the driven shaft of the transmission before the shiftable sleeve is positively connected to the driven member. In this manner, meshing of the teeth of the clutch element of the driven shaft with the teeth of the shiftable clutch member is delayed until the rotation of the driving shaft, or the train of gears, has been synchronized with that of the driven shaft.

In the form shown in the drawing, my improved synchronizing apparatus is illustrated in connection with a shiftable clutch element which is used to selectively form a positive direct driving relation between the clutch and main shafts of the transmission, and a positive driving connection between a lower speed train of gears and the main shaft. Substantially the same structure, however, may be employed in a transmission having a shiftable clutch element which co-operates with any two driving members that are rotated at various rates.

The transmission shown is of the four speed type used in vehicles and it includes a casing 1 in which are journaled axially driving and driven shafts 2 and 3, respectively. The driving shaft 2 has a pinion 4 on its intermediate portion which meshes with internal teeth 5 of an eccentrically located sleeve 6 that is rotatably supported in the casing by roller bearings 7'. The sleeve 6 has external teeth 7 on its inner extremities which mesh with internal teeth 8 of a sleeve 9 that is concentrically located with respect to the driving and driven shafts 2 and 3, and rotatably supported on rollers 10. Formed on the right end of the sleeve 9 are inwardly extending clutch teeth 11 which are spaced apart a distance equal to twice the width of one tooth. The sleeves 6 and 9 and their teeth form a train of gears which produces a gear ratio that is lower than a direct drive. In the illustration shown, the sleeve 9 corresponds to the third speed gear of the transmission.

The eccentrically located sleeve 6 has external teeth 12 which mesh with the teeth of a gear 13 of a counter-shaft 14 which has an integral second speed pinion 15 and a low speed pinion 16. The pinion 15 is adapted to drive a second speed gear 17 which is splined on the driven shaft 3 of the transmission, and the low speed pinion 16 is adapted to drive a low speed gear 18 that is also splined on the driven shaft 3. The second and low speed gear and pinion arrangement, and the second and low speed gear shifting apparatus is substantially identical to the standard and well known selective transmission structure which is commonly used in vehicles.

Mounted on the main shaft 3 adjacent a clutch element 19 on the driving shaft 2 which has external clutch teeth 20, is a clutch element 21 in the form of a sleeve that is secured against rotation relative to the main shaft by the splines thereof and against axial displacement by a pin 22. This sleeve is provided at its respectively opposite ends with a pair of series of clutch teeth 23 and 24, the ends of alternate teeth of each series protruding beyond ends of the other teeth. Formed in the sleeve 21 intermediate the ends of the teeth 23 and 24 are grooves 25 and 26, respectively in which yieldably resilient metal bands 27 and 28 are seated. The inner adjacent edges 29 and 30 of the bands 27 and 28 are beveled and the bands normally protrude beyond the sleeve and the teeth 23 and 24.

A shiftable clutch member 31 including a sleeve which is concentrically mounted with respect to the clutch element 21 of the main shaft and which is free to rotate relative thereto and to the third speed train of gears and driving shaft 2 is provided for selectively forming a positive driving connection between the main shaft and the driving shaft and between the former shaft and the third speed train of gears. This shiftable member has internal and external clutch teeth 32 and 33 which are adapted to be selectively meshed with the clutch teeth 20 and the clutch teeth 11 of the driving shaft 2 and sleeve 9 of the third speed train of gears, respectively. Another series of internal clutch teeth 34 formed on the sleeve 31 is located between the pairs of series of clutch teeth 23 and 24 of the clutch element 21 of the main shaft. The teeth 34 lie in a staggered arrangement with their ends alternately protruding and receding at both extremities. When the sleeve 31 is in its inoperative position shown in Fig. 2, the clutch teeth 32 and 33 are located in closer proximity to the clutch teeth 20 and 11 with which they co-operate, than the clutch teeth 34 are to the teeth 23 and 24 of the sleeve 21. This arrangement produces a meshed engagement of the teeth 32 and 20 before the teeth 23 and 34 mesh when the shiftable clutch element is moved to the left, and it also causes the teeth 33 and 11 to mesh before the teeth 34 and the teeth 24 are brought into engagement with each other when the shiftable clutch element is moved to the right, as viewed in Fig. 2.

The shiftable clutch element 31 is provided on its inner periphery with beveled machined surfaces or seats 35 and 36 which register respectively with the bevel edges 29 and 30 of the split bands 27 and 28. The beveled seat 35 is located at a greater distance from the beveled edge 29 of the ring 27 than the teeth 32 of the shiftable sleeve are from the teeth 20 of the driving shaft so that as the sleeve 31 is moved to the left, the teeth 20 and 32 interlock before the band 27 frictionally engages the seat 35. The internal teeth 34 of the intermediate portion of the sleeve 31 are located further from the teeth 24 of the clutch element 21 than the seat 36 is from the bevel edge 30 of the band 28 and therefore the teeth 34 do not engage the teeth 24 until after the band has frictionally engaged the shiftable clutch element 31. A similar relation exists between the seat 36 of the shiftable clutch member, the bevel edge 30 of the band 28, the teeth 11 of the sleeve 9 of the third speed train of gears and the teeth 33 and 34 of the shiftable sleeve 31. In other words, as the sleeve 31 is shifted to the right, the teeth 33 and 11 initially interlock; then the band 28 frictionally engages the seat 36 of the shiftable clutch element, and lastly, the teeth 34 of the shiftable clutch element interlock with the teeth 24 of the clutch element 21 on the main shaft.

The shiftable clutch element 31 is operated by gear shifting mechanism of conventional construction which includes a gear shift shaft 37 which is slidably mounted in bearings 38 in the casing 1. The gear shift shaft 37 has a notch 39 at its forward end in which a knob 40 of a universally mounted gear shift lever 41 is received. Mounted on the gear shift shaft 37 is a fork 42 which is received in a groove 43 of the shiftable clutch element 31.

In operation, when the third and fourth speeds of the transmission are not in use, the shiftable clutch element 31 is in the position shown in Fig. 2 and the first, second and reverse speed driving units may be selectively placed in operation in a conventional manner. When it is desired to effect a fourth speed driving relation between the driving and driven shafts 2 and 3 of the transmission, the gear shaft lever is manipulated so as to move the shiftable clutch element 31 to the left, as viewed in Fig. 2. The teeth 32 of the shiftable clutch member which are spaced apart a distance substantially equal to the distance between the protruding end portions of alternate teeth 20 on the driving shaft 2, readily interlock without causing severe clashing of teeth. As the sleeve 31 is of comparatively light weight it offers little or no resistance to the driving action of the teeth 20 and is immediately rotated in unison therewith. Further leftward movement of the shiftable sleeve 31 bringing the beveled edge 29 of the synchronizing band 27 into frictional engagement with the bevel seat 35 of the shiftable clutch member 31. The frictional engagement between these two members causes the rotation of the shiftable sleeve 31 and driving shaft 2 to be synchronized with the rotation of the driven, or main shaft 3. Then as the shiftable, rotatable element 31 is moved still further to the left, as viewed in Fig. 2, the band 27 is contracted and received within the inner periphery of the sleeve 31 and finally the teeth 34 of the shiftable sleeve are interlocked with the teeth 23 of the clutch element on the main shaft. In this manner, the rotation of the sleeve 31 is synchronized with the rotation of the main shaft before the teeth 34 are engaged together and therefore the teeth 34 and 23 are not required to overcome the inertia of the driving shaft and all of the mechanism with which it is connected at the instant they are moved together.

Substantially the same sequence of operations occurs during movement of the shiftable clutch element to a third speed driving position. In this case the shiftable sleeve 31 is moved to the right, as viewed in Fig. 2, forming an initial interlocked condition between the teeth 33 and 11 of the shiftable sleeve and the sleeve 9 of the third speed train of gears, respectively. Then before the internal clutch teeth 34 of the shiftable sleeve 31 are brought into engagement with the teeth 24 of the clutch element 21 on the main shaft, the ring 28 of the latter clutch element is frictionally engaged upon the seat 36 of the shiftable sleeve so as to synchronize the rotation of the main shaft 3 with the rotations of the shiftable clutch member 31 and the third speed train of gears.

Any suitable synchronizing means such as multi-plate or disc units may be used in place of the contractable rings 27 and 28, if desired, and satisfactory results are obtained by arranging such synchronizing devices so that they will become operative after the shiftable sleeve has been interlocked selectively with either driving unit of a pair of variable speed units and before the shiftable sleeve has become interlocked with the member to which it is desired to transmit power from the variable speed driving units. With the above construction, the light weight shiftable sleeve is the only clutch member that is meshed with another clutch element before bringing the cooperating clutch elements to substantially synchronized rotations and therefore gear clashing and grinding is materially reduced.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. In transmission mechanism having driving and driven shafts and having a train of gears operable by said driving shaft; external clutch elements fixed on said driving and driven shafts and internal clutch elements fixed on a gear of said train of gears respectively, a shiftable clutch member including internal and external means for selectively interlocking initially with either the clutch element of said driving shaft or the clutch element of said gear respectively, frictional driving means for co-acting between the clutch element of said driven shaft and said shiftable clutch member when the latter is interlocked with either the clutch element of said driving shaft or the clutch element of said gear, and means on said shiftable element for interlocking with the clutch element of the driven shaft thereafter.

2. Transmission mechanism including driving and driven shafts, a train of gears operable by said driving shaft, clutch elements fixed on said driving and driven shafts and on one gear of said train of gears respectively, a shiftable sleeve rotatably supported in concentric relationship with respect to said clutch elements having spaced series of clutch teeth thereon, one for selectively interlocking with each clutch element, internal seats on said sleeve, and self-energizing friction bands on the clutch element of said driven shaft, one engagable with one of the internal seats of said sleeve when the latter is shifted in either direction.

3. In a transmission mechanism, a driving member, a driven member, a train of gears having a permanent driving connection with said driving member, clutch teeth on said driving member and on one gear of said train of gears respectively, a pair of series of clutch teeth on said driven member, a shiftable sleeve having a separate series of clutch teeth for interlocking with the clutch teeth of said driving member and gear respectively and having a separate series of clutch teeth for interlocking with each series of clutch teeth of said driven member, said series of clutch teeth being located with respect to each other so as to cause the sleeve when shifted in one direction to become positively connected to the driving member before becoming positively connected to the driven member and to become positively connected with said gear, when shifted in another direction, before becoming positively connected with the driven member, and a pair of frictional members, one for synchronizing the rotation of said driven member and sleeve before the latter is positively connected with said driven member during shifting of said sleeve in each direction.

4. In transmission mechanism, a driven member, a pair of permanently connected driving members having different rotational speeds, external clutch elements on one driving member and on the other, external clutch elements on said driven member, a shiftable clutch member having external and internal clutch elements selectively engageable with the internal and external clutch elements on said driving members respectively and adapted to form a positive driving connection between said driven member and either of said driving members after it is engaged with either of said driving members, and means for synchronizing the rotations of the shiftable clutch member and driven member after engagement of said shiftable clutch member with either of said driving members and before engagement thereof with said driven member.

RAYMOND C. GRIFFITH.